Patented Feb. 9, 1954

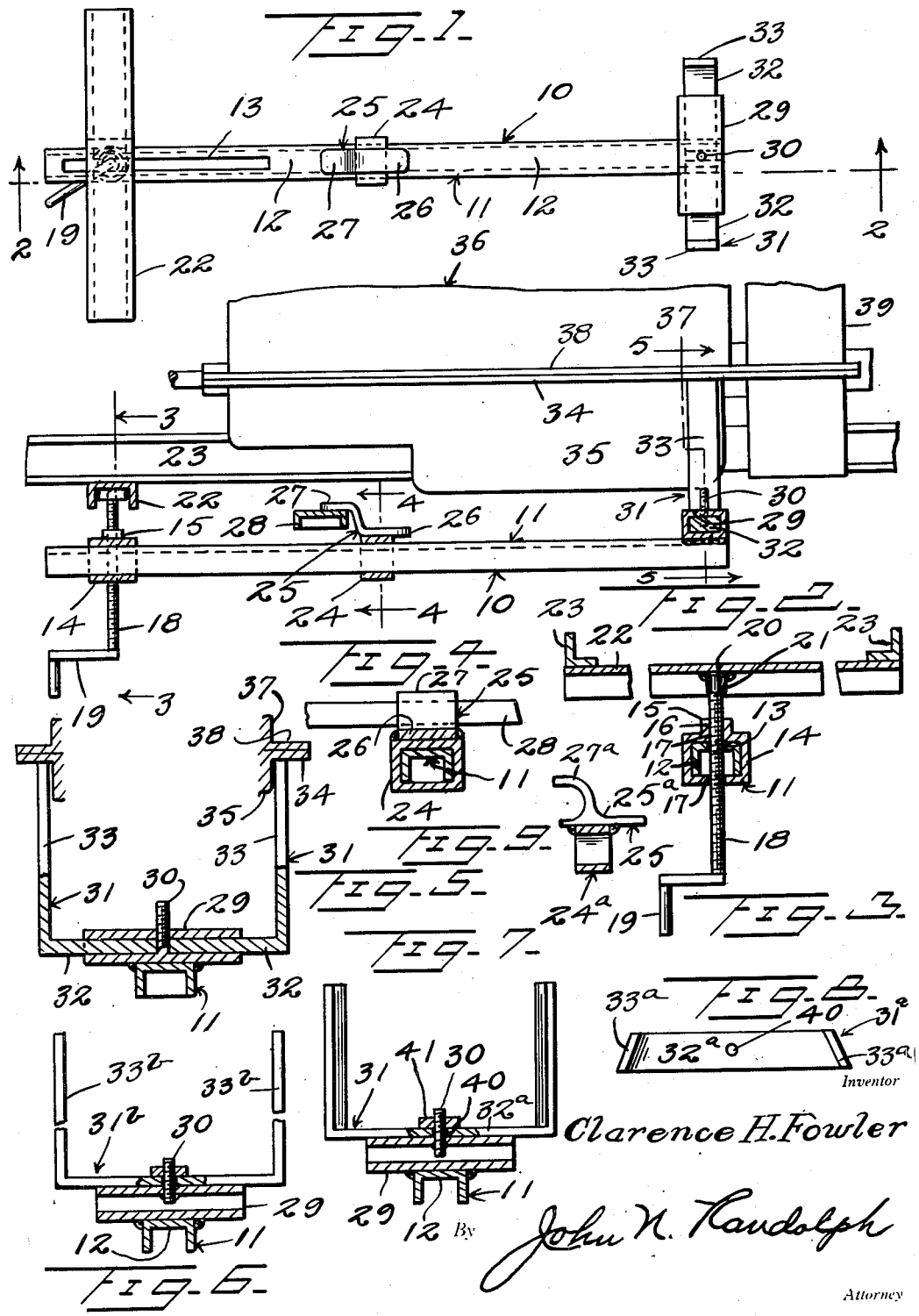

2,668,687

UNITED STATES PATENT OFFICE 2,668,687

MOTOR SUPPORT

Clarence H. Fowler, Dalhart, Tex.

Application August 22, 1951, Serial No. 243,079

3 Claims. (Cl. 254—126)

This invention relates to a novel support for internal combustion engines of motor vehicles and more particularly to a structure especially adapted to be used in supporting an internal combustion engine in a motor vehicle while the transmission unit is being removed and replaced and which is particularly adapted for use on late model automobiles having "automatic" transmissions which are much heavier than the transmissions of older cars.

More particularly, it is an aim of the present invention to provide a motor support which is supported by the frame of the vehicle forwardly of the engine and where it will not interfere with work to be done at the rear of the engine.

A further object of the invention is to provide a support no part of which touches the floor or supporting surface of the vehicle and which is disposed in a position so that it will not require moving as is usually necessary where a jack is employed in order to give additional room for removing and replacing the transmission.

Still a further object of the invention is to provide a support which is not required to bear against the bottom of the crankcase pan and which will therefore not bend or otherwise damage the pan as frequently occurs in utilizing a jack for supporting an engine.

Still another object of the invention is to provide a tool parts of which are readily adjustable for accommodating the tool to substantially all makes of automobiles and including interchangeable parts for fitting frame portions and engine portions of different shapes and sizes.

Various other objects and advantages of the invention will hereinafter become more fully apparent from the following description of the drawing, illustrating a presently preferred embodiment thereof, and wherein:

Figure 1 is a plan view of the fully assembled invention;

Figure 2 is a longitudinal sectional view thereof taken substantially along a plane as indicated by the line 2—2 of Figure 1 and showing the support in an applied position;

Figure 3 is a cross sectional view taken substantially along a plane as indicated by the line 3—3 of Figure 2;

Figure 4 is a cross sectional view taken substantially along a plane as indicated by the line 4—4 of Figure 2;

Figure 5 is a cross sectional view taken substantially along a plane as indicated by the line 5—5 of Figure 2;

Figures 6 and 7 are cross sectional views taken substantially along planes generally corresponding to the plane of Figure 5 and showing modified adaptor units;

Figure 8 is a top plan view of the adaptor unit of Figure 7, and

Figure 9 is a side elevational view, partly in section of a modification of one part of the invention.

Referring more specifically to the drawing, a novel motor support in its entirety is designated generally 10 and includes a main beam 11 which is preferably of inverted channel shaped cross section. The upper, web portion 12 of the beam 11 is provided with elongated slot 13, adjacent one end thereof and which extends longitudinally of the beam 11. A sleeve 14, of rectangular cross section, as seen in Figure 2, is slidably and removably mounted on the slotted end of the beam 11 and is provided on its upper side with an upstanding boss 15 having a threaded bore 16 which aligns with openings 17 in the top and bottom walls of the sleeve 14 and which are slightly larger in diameter than the threaded bore 16. The bore 16 and openings 17 likewise register with the slot 13 to receive a screw 18 which is threaded through the bore 16 and extends loosely through the openings 17 and slot 13. The screw 18 is provided with a crank 19 at its lower end and has an upper end 20 of slightly reduced diameter which is adapted to seat against a cross member, not shown, of a motor vehicle frame or in a downwardly opening socket 21 of an elongated brace member 22. The brace member 22 is of inverted channel shaped cross section and the end portions thereof are adapted to be disposed beneath and bear against longitudinal beams 23 of a motor vehicle frame or chassis.

A collar, designated 24, is slidably mounted on the intermediate portion of the beam 11 and which is removable from said beam over its slotted forward end when the screw 18 is removed from the sleeve 14 and said sleeve 14 is removed from said slotted beam end. The collar 24 is likewise of substantially rectangular cross section as seen in Figure 4 and has a bar, designated generally 25 secured thereto. The bar 25 has one end 26 secured to the upper surface of the collar 24 and an upwardly offset opposite end 27 which is adapted to engage on the upper side of the center portion of a cross member 28, forming a part of the vehicle frame and chassis and which extends between the two front wheels, not shown, of a motor vehicle which has independent spring suspensions. The parts 24 and 25 form an adjustable supporting hook of the motor support 10.

A cross head 29 is secured to the upper side of the opposite, rear end of the beam 11 and is supported thereon intermediate of its ends and crosswise of the beam 11. The cross head 29 is of hollow rectangular cross section and has a threaded stud 30 secured therein and which projects upwardly from its upper side and intermediate of its ends. The cross head 29, as best illustrated in Figure 5, normally demountably supports a pair of L-shaped members 31 which combine to form an adjustable motor supporting unit each of which is provided with a short leg 32 and a long leg 33. The short legs 32 extend into the ends of the cross head 29 and the long legs 33 extend upwardly from the outer ends of the legs 32. The upper ends of the legs 33 are adapted to bear under portions of the flange 34 of a crankcase pan 35 for supporting the weight of an internal combustion engine 36 and so that the weight thereof will be borne by the engine block 37 through its bottom flange 38, against which the flange 34 abuts. The legs 32 are shown disposed with their adjacent ends abutting the lower end of the stud 30; however, it will be readily apparent that the legs 32 may be displaced away from one another to increase the spacing between the upright legs 33 for accommodating the supporting unit 31, 31 to crankcase pans of different widths, and the downward pressure exerted on the outer ends of the legs 32 by the engine 36 will frictionally retain the legs 32 in adjusted positions in the ends of the cross head 29.

Assuming that the motor support 10 is assembled as illustrated in Figures 1 and 2, the rear end of the beam 11 is positioned so that the upper ends of the legs 33 can engage under portions of the flange 34 near the rear end of the engine 36. The hook 24 is then moved longitudinally of the beam 11 until its upwardly and forwardly offset bill portion 27 can engage on the cross member 28. The sleeve 14 is then slid longitudinally of the forward end of the beam 11 with the screw 18 being accommodated in the slot 13, so that the cross member 22 can engage under the frame members 23, as seen in Figure 3, a substantial distance forwardly of the hook 24, 25. If the vehicle frame is provided with a cross member forming a part thereof and which is located adjacent the position of the cross member 22 as seen in Figure 2, said cross member 22 may be omitted and the upper end 20 of the screw may directly engage the frame cross member, not shown. The crank 19 is then turned to advance the screw 18 upwardly through the boss 15 to force the forward end of the beam 11 downwardly and to cause said beam to fulcrum counterclockwise as seen in Figure 2 relatively to the frame cross member 28 which is engaged by hook portion 27 for elevating the rear end of the beam 11 and the cross head 29. In this manner, the rear end of the engine 36 will be elevated so that the transmission 39 may be removed and replaced. It will be noted that no part of the motor support 10 engages a supporting surface of the vehicle but instead the motor support is supported by a vehicle chassis and in turn supports the vehicle engine, so that all of the area beneath the beam 11 is exposed for affording ample space for the mechanics accomplishing the work involved in removing and replacing the transmission. Consequently, the support 10 may be left in its applied position of Figure 2 while the transmission is being removed and until it has been replaced, whereas it is frequently necessary to remove a jack from beneath an engine during this operation to provide necessary room for the mechanics. Furthermore, the engine 36 is only engaged at the flange 34 which abuts the block flange 38 so that there is no danger of damaging the pan 35 whereas in using a jack it is ordinarily necessary to place the jack beneath the bottom of the pan which frequently results in bending the pan upwardly.

For certain automobiles not having individually suspended front wheels, a front axle is employed in lieu of the cross member 28. When the motor support 10 is utilized on such a vehicle, the supporting hook 24, 25 is removed and replaced by a supporting hook 24a, 25a, illustrated in Figure 9 and which differs from the hook 24, 25 only in that in lieu of the portion 27, the member 25a is provided with an upwardly and forwardly curved hook portion 27a which is shaped to engage over a front axle of substantially circular cross section.

For certain makes of automobiles and other motor vehicles, the pan is rounded or tapered adjacent its rear end. For such vehicles, the engine supporting unit, designated generally 31a may be substituted for the members 31 forming the supporting unit, previously described. The member 31a is substantially U-shaped and includes a substantially flat bottom portion or web 32a which is adapted to rest upon the upper surface of the cross head 29 and longitudinally thereof. The web 32a is provided with an opening 40 intermediate of its ends to loosely receive the stud 30 which extends upwardly therethrough and a nut 41 may be threaded on the stud 30 against the upper side of the web 32a. The member 31 is provided with upstanding legs 33a at the ends of the web 32a, the inner sides of which are disposed in rearwardly converging relationship to one another to accommodate said uprights 33a to a rounded or tapered crankcase pan, not shown.

Figure 6 illustrates another modified form of engine support designated generally 31b which is mounted in the same manner as the member 31a and which differs therefrom only in that the planes of the uprights 33b are disposed parallel to one another. The member 31b is particularly designed to correctly fit a popular make of automobile and the legs 33b are made longer than the legs 33 and are spaced a proper distance apart to straddle a crankcase pan of the engine of this make of automobile.

Various modifications and changes are contemplated and may obviously be resorted to, without departing from the spirit or scope of the invention as hereinafter defined by the appended claims.

I claim as my invention:

1. The combination with a vehicle engine supporting and elevating device, detachably mounted in and adjustably supported solely by a vehicle chassis, comprising an elongated beam adapted to be disposed beneath a vehicle chassis and longitudinally thereof, a supporting hook connected to the beam intermediate of its ends having an upwardly offset bill portion adapted to engage on a transverse frame member of the chassis and forming a fulcrum for the beam, screw means extending upwardly through said beam adjacent a first end thereof and adapted to engage under a part of the chassis for displacing said first end of the beam downwardly when said screw means is advanced upwardly to cause the beam to fulcrum on the transverse frame member for swinging the other second end of the beam upwardly, and an engine engaging unit including transversely spaced uprights supported on and rising from the second end of the beam and adapted to engage under portions of an engine disposed in the chassis for elevating the engine relatively to the chassis when the said screw means is advanced upwardly, said engine engaging unit including an elongated cross head secured to and disposed transversely on the second end of said beam, said cross head having a bore extending therethrough of non-circular cross section, a pair of L-shaped members having short legs slidably and adjustably mounted in the ends of said cross head and upwardly extending long legs rising from the remote ends of said short legs and forming said transversely spaced engine engaging uprights, said short legs being adjustable in the ends of said cross head to vary the spacing between the long legs.

2. The combination with a vehicle engine supporting and elevating device, detachably mounted in and adjustably supported solely by a vehicle chassis, comprising an elongated beam adapted to be disposed beneath a vehicle chassis and longitudinally thereof, a supporting hook connected to the beam intermediate of its ends having an upwardly offset bill portion adapted to engage on a transverse frame member of the chassis and forming a fulcrum for the beam, screw means extending upwardly through said beam adjacent a first end thereof and adapted to engage under a part of the chassis for displacing said first end of the beam downwardly when said screw means is advanced upwardly to cause the beam to fulcrum on the transverse frame member for swinging the other second end of the beam upwardly, and an engine engaging unit including transversely spaced uprights supported on and rising from the second end of the beam and adapted to engage under portions of an engine disposed in the chassis for elevating the engine relatively to the chassis when the said screw means is advanced upwardly, said engine supporting unit including a cross head mounted on the second end of the beam and crosswise thereof, a stud secured to and rising from the intermediate portion of said cross head, a U-shaped member having a bottom web portion resting on said cross head and provided with an opening intermediate of its ends through which the stud extends, and said U-shaped member having upstanding legs rising from the ends of the web forming said uprights of the engine engaging unit.

3. An engine as supported in claim 2, said legs having inner surfaces disposed in converging relationship to one another in a direction away from the first end of the beam.

CLARENCE H. FOWLER.

References Cited in the file of this patent

UNITED STATES PATENTS

| Number | Name | Date |
|---|---|---|
| 805,681 | Steadham | Nov. 28, 1905 |
| 2,320,805 | Smith | June 1, 1943 |
| 2,449,850 | Huhle | Sept. 21, 1948 |
| 2,521,266 | Swisher | Sept. 5, 1950 |
| 2,555,808 | Murray | June 5, 1951 |